United States Patent [19]
Ramsdale et al.

[11] Patent Number: 5,265,263
[45] Date of Patent: Nov. 23, 1993

[54] HANDOVER TECHNIQUES

[75] Inventors: Peter A. Ramsdale, Widdington; Philip S. Gaskell, Shelford, both of United Kingdom

[73] Assignee: STC PLC, London, England

[21] Appl. No.: 655,635

[22] Filed: Feb. 14, 1991

[30] Foreign Application Priority Data

Apr. 6, 1990 [GB] United Kingdom ............ 9007808

[51] Int. Cl.⁵ .................. H04B 7/00; H04Q 7/02; H04Q 9/00
[52] U.S. Cl. ................... 455/33.2; 455/54.1; 455/56.1; 379/60
[58] Field of Search .......... 455/33.1, 33.2, 33.3, 455/33.4, 34.1, 34.2, 54.1, 54.2, 56.1; 379/59, 60, 63, 58

[56] References Cited

U.S. PATENT DOCUMENTS 4,144,496 3/1979 Cunningham et al. .......... 379/60
4,696,051 9/1987 Breeden .................... 455/56.1
4,723,266 2/1988 Perry.

FOREIGN PATENT DOCUMENTS 0347396 12/1989 European Pat. Off. .
2006579 5/1979 United Kingdom .
2203018 10/1988 United Kingdom .
2225196 5/1990 United Kingdom .

Primary Examiner—Jin F. Ng
Assistant Examiner—Lisa Charouel
Attorney, Agent, or Firm—Lee, Mann, Smith, McWilliams, Sweeney & Ohlson

[57] ABSTRACT

In a cellular radio system including a plurality of cells (e.g. cell sectors or micro cells) (4, 5, 8, 9, 10, 11) each normally using a respective channel for interference reduction purposes, a number of the cells are arranged in groups (6) and in the event of a cell associated with equipment moving within a group (6), all cells (4, 5, 8, 9, 10, 11) of that group use a common channel whereby to facilitate handover between them.

13 Claims, 4 Drawing Sheets

HANDOVER TECHNIQUES

BACKGROUND OF THE INVENTION

This invention relates to cellular radio systems and in particular to handover techniques for use with communications networks including radio cells.

Handover is a technique that allows calls in a personal or mobile communication network to be maintained as a handset or mobile station moves between radio cells. After a call is set up, the quality of the radio link is monitored by the handset and by the associated cell base station. In addition, other channels from the same and adjacent cells are also monitored as potential links to handover to. According to pre-defined criteria the call is switched to another base-station as the mobile/handset moves, or the propagation conditions change, in order to maintain a good quality link. If this is not done, then the call quality may deteriorate seriously or the call may be "dropped" altogether. Either the network or the handset/mobile may incorporate the intelligence to enable the decisions to be made on when, whether and to which cell the radio link should be switched.

This type of handover is well known and widely adapted in conventional cellular systems. However, it gives rise to problems in mobile or personal communication networks where handsets or mobiles are moving at speed through areas covered by small cells such as sectored or microcells. Since the cells are small, the time spent in a cell is short and the time taken to initiate and perform handover may be too long. This leads to poor call quality and dropped calls.

SUMMARY OF THE INVENTION

According to one aspect of the present invention there is provided a cellular radio system including a plurality of cells each normally using a respective channel for control purposes, wherein a number of adjacent cells comprise a group of cells and in the event of a call associated with equipment moving in said group of cells the equipment is allocated a common channel for all cells of the group whereby to facilitate handover between the cells of the said group.

According to another aspect of the present invention there is provided a handover technique for use with a cellular radio system including a plurality of cells each normally using a respective channel for control purposes, a number of adjacent cells comprising a group of cells, and wherein in order to facilitate handover between the cells of a group in the event of a call associated with equipment moving in said group, a common channel is allocated to all cells of the group.

BRIEF DESCRIPTION OF THE DRAWINGS

Embodiments of the invention will now be described with reference to the accompanying drawings, in which.

DESCRIPTION OF THE PREFERRED EMBODIMENTS

Figure 1A:
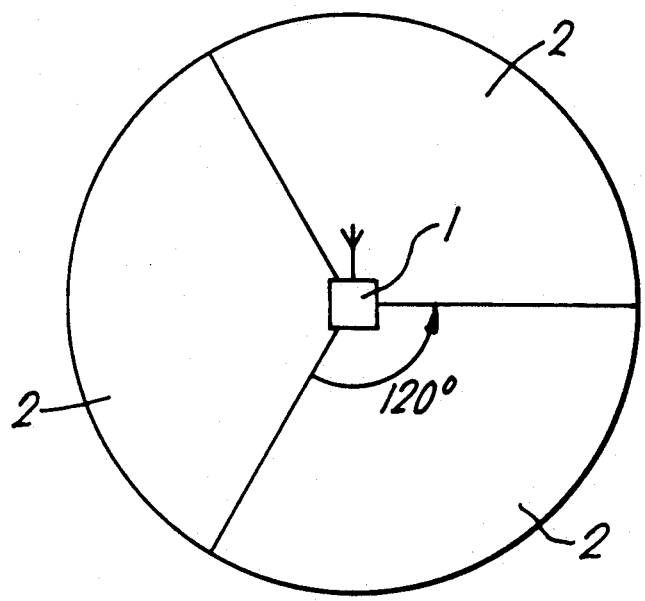
FIGS. 1a and 1b illustrate two examples of cell sectorisation.
Figure 1B:
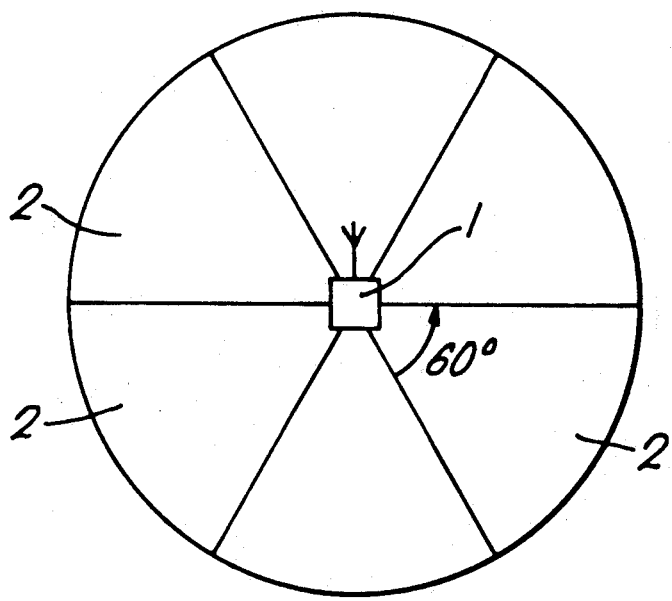

In some applications there are advantages, primarily of reduced interference, if a cell, typically 1 to 10 Km radius, is sectorised into a group of smaller cells by means of a directional antenna. FIGS. 1a and 1b show examples of 120 degree and 60 degree sectorisation. The multiple directional antenna 1 in each case normally serves to provide a respective control channel for each sector 2 of the cell. If the sectors are small, then handsets or mobile phones moving at speed can suffer poor call quality and dropped calls.

Figure 2:
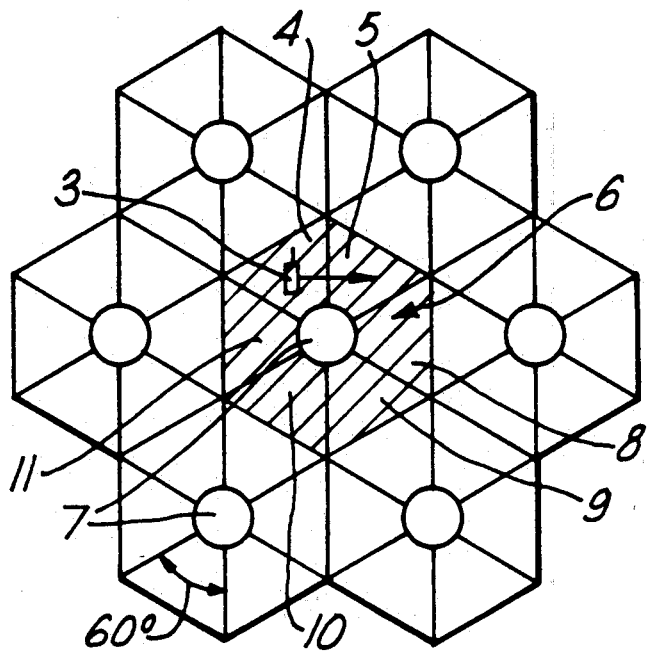
FIG. 2 illustrates an array of sectored cells and handover within a group of sectored cells.

Conventionally, sectored cells use mutually exclusive channel sets to reduce interference, that is each sector of a cell has a respective channel of the set and each adjacent sectored cell has a different channel set. When a handset 3 (FIG. 2) moves from one cell sector 4 to another sector 5 of the same cell 6 (group of sectors) then a cell has to be handed over to a new channel supplied by the base station 7 in the adjacent sector 5, thereby leading to a requirement for very rapid handover.

This can be avoided in the following way. When movement of the handset 3 is detected, such as by bit error rates (BER) or low field strength, then a common "umbrella" channel is allocated to that handset in all the adjacent, nearby cell sectors i.e. the group of sectors 4, 5, 8, 9, 10, 11 making up the sectored cell 6 which itself covers a relatively large area. The base station antenna of the cell sectors of the group all transmit on the handset channel simultaneously in a synchronous or quasi-synchronous (simulcast) manner. This allows the handset to move between cell sectors within the group without handover explicitly taking place and without the handset having to switch channels since the operating channel for the handset in adjacent cell sectors is the same.

Although a single virtual channel is allocated to all cell sectors within a group, it is not essential for this channel to be the same physical channel. Thus the channels could be on different frequencies or time slots (in a TDMA frame). Since the channel frequency in each cell sector is pre-assigned and known a priori, handover to that cell sector can be performed more rapidly than with conventional handover. Under these or similar circumstances, it is not necessary for more than one base station to transmit at a time.

Figure 3:
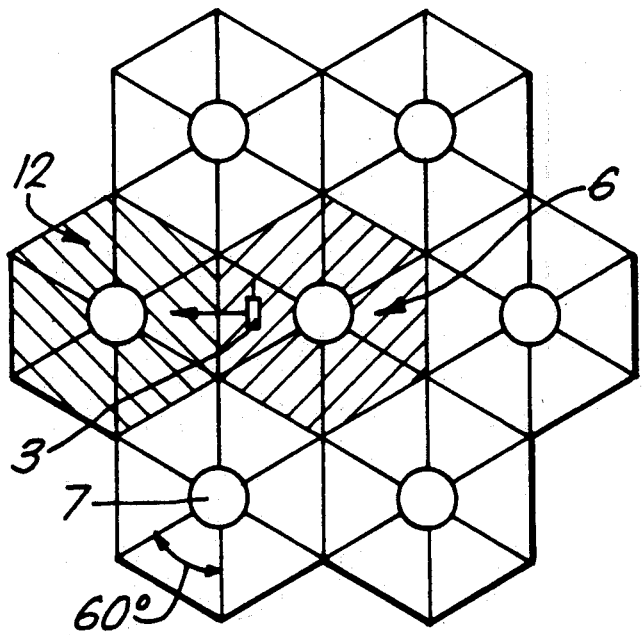
FIG. 3 illustrates an array of sectored cells and handover between one group of sectored cells and another.

When the handset 3 moves outside of one cell 6 (group of cell sectors) (FIG. 3) to another 12, then handover is performed in the normal way to the new sector channel, or new "umbrella" channel if movement continues.

Another method of achieving continuous radio coverage is to use an array comprising a large number of overlapping microcells 13 (FIG. 4) which are typically 200 m in radius and have base stations 15. The main advantage of this is than the radiated power from the handset is low, as all radio paths are short, thus leading to longer battery life. However, as before, there are problems of performing handover very rapidly for handset moving at speed. This can be solved in a similar manner to that described above for sectored cells.

Figure 4:
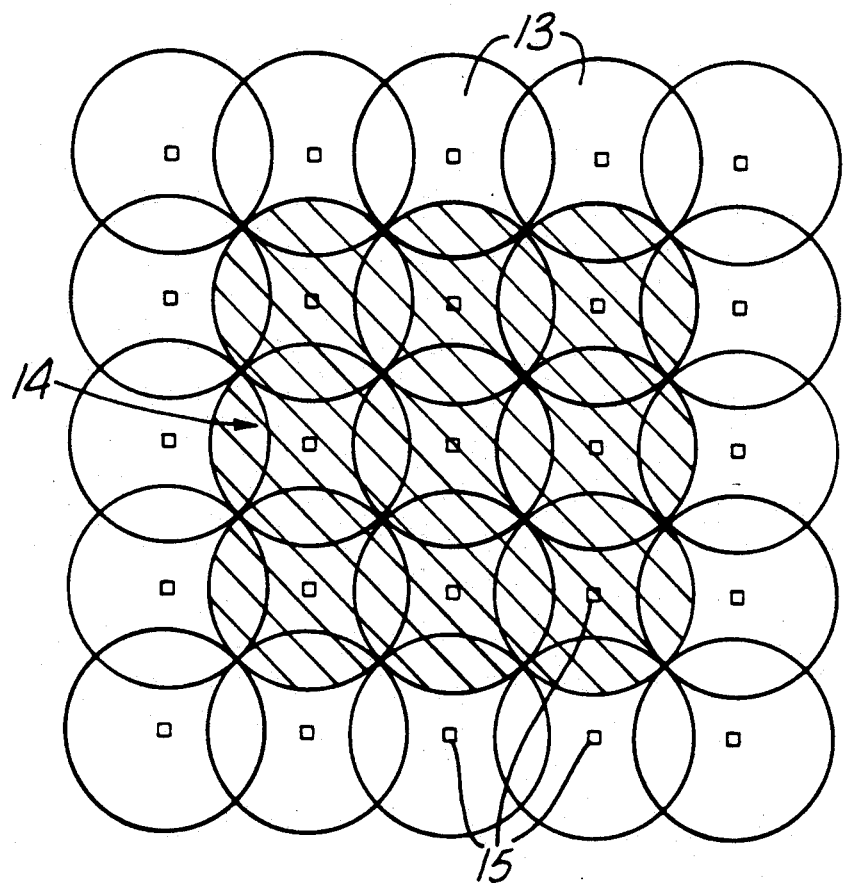
FIG. 4 illustrates an array of contiguous micro cells.
Figure 5:
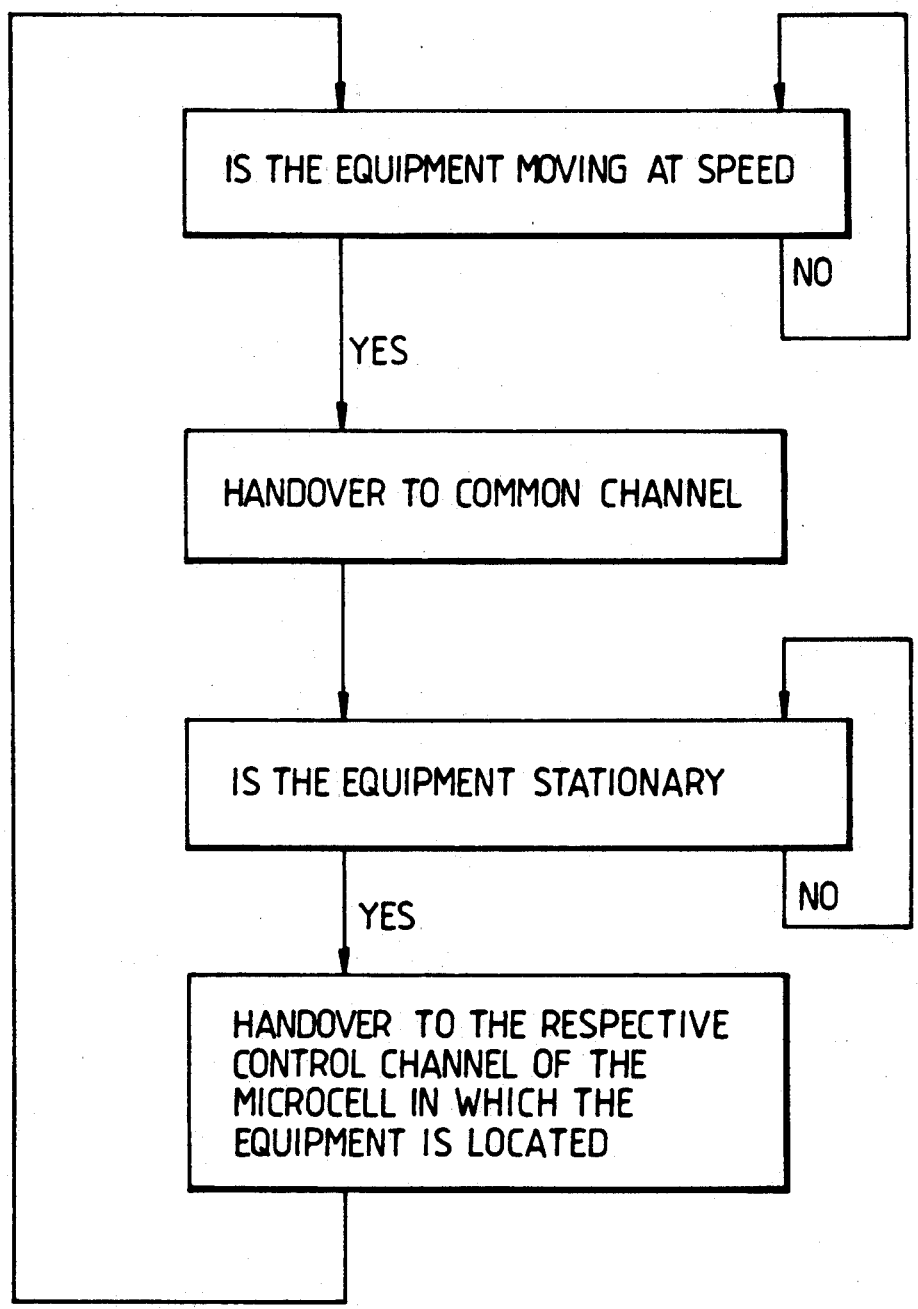
FIG. 5 illustrates a handover algorithm.

For reasons of interference reduction, adjacent microcells normally use different channels, as determined by a channel allocation scheme. However, when movement of a handset is detected (such as by marginal BER, low field strength or delay measurements), then a common "umbrella" channel is allocated to that handset in all of the microcells within a group of adjacent or nearby cells, that is a sub-array of the overall array. The hatched region of FIG. 4 illustrates such a sub-array i.e. a group 14 of nine microcells. The handover technique within and between groups is then exactly the same as for the sectored cells. The basic algorithm for handover is illustrated in FIG. 5, which is considered to be self-explanatory.

Alternatively, an area can be covered by macrocells each having an underlay of non-contiguous or overlapping microcells, each said macrocell and its associated microcells comprising a single two-layer cell. This "umbrella" approach covers movement of a mobile through a group of cells, however when stationary there can be fall back to the individual control channel in cell regime.

In summary, in the case of an area covered by sectored cells or overlapping microcells, calls from moving handsets are allocated a common channel across a number of cells forming a group of cells, allowing handover to take place very rapidly between cells of the group. When the handset moves between different groups of cells, handover takes place between the cells in the normal way. The common channel may be achieved by simultaneous transmission from many base stations or base station antennae within a group of cells, for overlapping microcells or sectored cells, respectively, which transmission can be in a synchronous or quasi-synchronous mode.

Attention is directed to our co-pending GB Application No. 9007809.8 (Serial No. GB A 2242806) (P.A. Ramsdale 5-4) corresponding to U.S. patent application Ser. No. 07/655634 filed Feb. 14, 1991, which relates to other handover techniques.

We claim:

1. A cellular radio system for operation over an area covered by a plurality of cells, in any of which cells calls may be associated with a mobile equipment, wherein for interference reduction purposes each cell is allocated a respective control channel which is applicable when the equipment is stationary in that cell, wherein a number of cells which are adjacent to one another constitute a group of cells, there being at least one said group of cells, and including means to monitor the movement of the equipment and means whereby in the event of one said call associated with the mobile equipment and when the mobile equipment is moving at speed through said group of cells, the adjacent cells constituting the one said group of cells are allocated a common control channel whereby handover of the mobile equipment moving between the adjacent cells constituting the one said group of cells is facilitated.

2. A cellular radio system as claimed in claim 1 wherein each said cell is divided into a plurality of cell sectors and each cell sector is allocated the respective control channel which is applicable when the mobile equipment is stationary in that cell sector, wherein a number of said cell sectors which are adjacent to one another constitute a group of cell sectors, and wherein in the event of another said call associated with the mobile equipment and when the mobile equipment is moving at speed through said group of cell sectors, the adjacent cell sectors constituting the one said group of cell sectors are allocated the common control channel whereby handover of the mobile equipment moving between the adjacent cell sectors constituting the one said group of cell sectors is facilitated.

3. A cellular radio system as claimed in claim 1, wherein the area is covered by a plurality of macrocells with an underlay of non-contiguous or overlapping microcells, each said macrocell and the underlying microcells associated therewith together comprising a single two-layer cell constituting one of said plurality of cells.

4. A cellular radio system as claimed in claim 1, wherein the area is covered by a plurality of overlapping microcells disposed in an array, each said microcell comprising a respective one of said plurality of cells, and wherein the one said group of cells is comprised by a number of said microcells in a sub-array of said array.

5. A cellular radio system as claimed in claim 1 wherein there are first and second groups of cells and wherein in the event of the mobile equipment leaving the first group of cells, with which is associated a first common control channel, entering the second group of cells, with which is associated a second common control channel, and moving therein whilst said cell is in progress, handover to the second common control channel is performed.

6. A cellular radio system as claimed in claim 1 wherein the common control channel is achieved by simultaneous transmission from a number of cell base stations.

7. A cellular radio system as claimed in claim 6 wherein the transmission from the base stations are synchronous or quasi-synchronous.

8. A handover technique for use with a cellular radio system operating over an area covered by a plurality of cells, in any of which cells calls can be associated with a mobile equipment, which radio system is such that for interference reduction purposes each cell is allocated a respective control channel which is applicable when the equipment is stationary in that cell, and such that a number of said cells which are adjacent to one another constitutes a group of cells, there being at least one said group of cells, the handover technique including the steps of monitoring the movement of the equipment in order to determine when handover between the cells of one said group of cells is required in the event of a said call associated with the mobile equipment and when the mobile equipment is moving at speed through the one said group of cells, and in that event allocating a common control channel to all of the adjacent cells of the one said group of cells whereby to facilitate said handover.

9. A handover technique as claimed in claim 8 and for use with a cellular radio system wherein each cell is divided into a plurality of cell sectors and each cell sector is allocated the respective control channel which is applicable when the mobile equipment is stationary in the cell sector, wherein a number of said cell sectors which are adjacent to one another constitute a group of cell sectors, the handover technique including the steps of monitoring the movement of the mobile equipment in order to determine when handover between the cell sectors of the group of cell sectors is required in the event of another said call associated with the mobile equipment and when the mobile equipment is moving at speed through the one group of cell sectors, and in that event allocating the common control channel to all of the adjacent cell sectors constituting the one group of cell sectors whereby to facilitate said handover.

10. A handover technique as claimed in claim 8 and for use with a cellular radio system in which the area is covered by a plurality of macrocells with an underlay of non-contiguous or overlapping microcells, each macrocell and the underlying microcells associated therewith together comprising a single two-layer cell constituting one of said plurality of cells.

11. A handover technique as claimed in claim 8 and for use with a cellular radio system in which the area is covered by a plurality of overlapping microcells disposed in an array, each said microcell comprising one of said plurality of cells, and in which the one said group of cells comprises a number of said microcells disposed in a sub-array of said array.

12. A handover technique as claimed in claim 8 wherein the common control channel is achieved by simultaneous transmission from a number of cell base stations.

13. A handover technique as claimed in claim 12 wherein the transmissions from the base station are synchronous or quasi-synchronous.

* * * * *